United States Patent Office 2,829,657
Patented Apr. 8, 1958

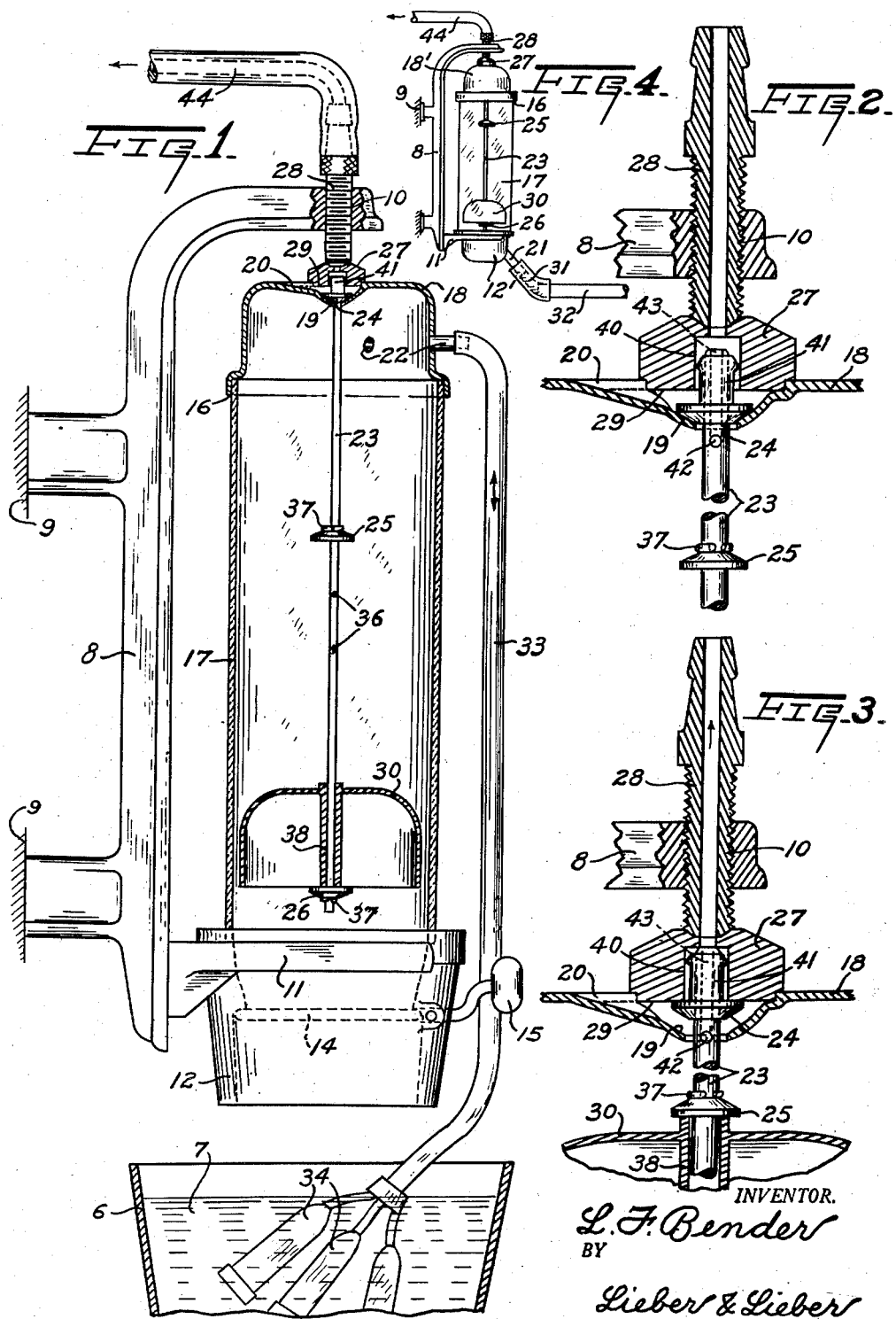

2,829,657
DAIRY EQUIPMENT CLEANER

Lloyd F. Bender, Hayward, Wis.

Application October 9, 1953, Serial No. 385,166

6 Claims. (Cl. 134—56)

The present invention relates in general to improvements in the art of washing and sterilizing dairy equipment or the like, and relates more specifically to improvements in the construction and operation of mechanism for automatically cleansing various parts of milking machines and similar equipment employed in dairies.

The primary object of the present invention is to provide an improved dairy equipment cleaner which is simple and compact in construction, and highly efficient in operation.

Numerous types of mechanisms intended to automatically wash and sterilize the teat cups, connecting tubes, and other parts of animal milking machines, have heretofore been proposed and used commercially with varying degrees of success, but all of these prior devices are either too cumbersome and complicated, or insufficiently rapid and reliable and efficient in operation, or too costly to construct, assemble, install, and to maintain in operating condition.

It is therefore an important object of my present invention to provide an improved dairy equipment washing and sterilizing unit which obviates all of the objectionable features of the prior devices of this kind, and which performs its intended function with utmost effectiveness.

Another important object of this invention is to provide an automatic cleanser for milking machine rubber assemblies or the like, which comprises few simple, durable, and sanitary parts capable of being manufactured at moderate cost, and conveniently installed, assembled, dismantled and cleaned.

A further important object of the invention is to provide an improved device adapted to clean and sterilize the teat cups, the connecting tubes, and the main milk conducting lines of milking machines, both rapidly and thoroughly with the aid of mechanism having very few movable parts.

Still another important object of my invention is to provide an exceedingly compact dairy equipment washer of relatively large capacity which requires minimum attention and renewal of parts.

An adidtional important object of the present invention is to provide an improved milking machine parts washer of the reverse flushing type which is automatically and effectively operable from the same vacuum source utilized to normally actuate the milking machines.

These and other more specific objects of the invention will be apparent from the following detailed description from which it may be noted that the gist of the invention is the provision of an automatic cleaner and sterilizer for the milk conducting lines and for the teat cups and connecting tubes of milking machines, wherein the cleansing liquid is caused to flow through these tubular elements in opposite directions with the aid of a stationary auxiliary receptacle to which the milking machine elements are connectable and the interior of which is alternately communicable with a source of vacuum and with the ambient atmosphere by means of a poppet valve which is operable by a float riding along a longitudinally movable upright valve carrying and actuating rod disposed within the receptacle and having thereon vertically spaced abutments or stops with which the float is cooperable to alternately shift the rod up and down.

A clear conception of the improved features constituting the present invention, and of the construction and operation of a typical commercial dairy equipment cleansing unit embodying the same, may be had by referring to the drawing accompanying and forming a part of the specification wherein like reference characters designate the same or similar parts in the various views.

Fig. 1 is a somewhat diagrammatic partial central vertical section through one of the improved dairy equipment cleaners, showing the liquid actuated float in its lowermost position with the control valve closed relative to the ambient atmosphere;

Fig. 2 is an enlarged fragmentary central vertical section through the upper portion of the same unit, also showing the receptacle pressure control valve closed;

Fig. 3 is a likewise enlarged fragmentary central vertical section through the same unit, but showing the pressure control valve open; and Fig. 4 is a side view of a modified unit for cleansing the milk conducting lines.

While the invention has been shown and described herein as having been specifically embodied in a small unit especially adapted to wash and sterilize the main milk conducting lines, the teat cups, connecting tubes, and other rubber assemblies of standard vacuum actuated animal milking machines, it is not my desire or intent to unnecessarily restrict the use of the improved features by virtue of this limited embodiment; and it is also contemplated that specific descriptive terms utilized herein be given the broadest possible interpretation consistent with the disclosure.

Referring to the drawing, the improved milking machine teat cup and conecting tube washer shown in Figs. 1, 2 and 3, comprises in general, a source of cleansing fluid such as a tub or reservoir 6 having an abundant supply of fresh sterilizing and cleansing liquid 7 therein; a sturdy main frame or bracket 8 adapted to be firmly mounted upon a wall 9 or other support, and having a screw threaded opening 10 at its upper end and a rigid shelf 11 near its lower extremity disposed in relatively close proximity to and above the reservoir 6; a liquid outlet valve housing 12 fixedly but removably secured to the shelf 11 and having therein an automatic flapper type discharge valve 14 adapted to pass liquid to the reservoir 6 by gravity and to close under the influence of a counter-weight 15; an auxiliary liquid receptacle 16 consisting of a transparent upright tubular casing 17 having its lower end snugly confined within the valve housing 12 while its upper end forms an anular support for a closure cap 18 provided with a central valve seat 19 and with one or more recesses 20 radiating from the seat, the cap 18 having one or more cleansing liquid inlet connections 22 all communicable with the upper interior of the receptacle 16; a vertically movable elongated member or rod 23 disposed centrally within the receptacle 16 and having a control valve 24 cooperable with the seat 19 and secured to its upper extremity while its lower portion is provided with spaced upper and lower abutments or stops 25, 26, respectively; a centrally bored clamping block 27 adapted to be pressed against the casing cap 18 by a threaded nipple 28 coacting with the bracket opening 10, and providing a flat seat 29 for the plane top surface of the control valve 24 when lifted, the interior of the nipple 28 being communicable with a source of vacuum; and an inverted cup-shaped float 30 movable along the upright rod 23 and being alternately engageable with the stops 25, 26 to actuate the pressure control valve 24.

The reservoir 6 may be removable or otherwise adapted for periodical thorough cleansing and washing liquid 7 should be frequently changed and maintained in relatively clean condition at all times. The bracket 8 may be formed of a sturdy casting, and should be constructed for convenient but rigid attachment to a wall 9 or other fixed support, and the lower shelf 11 should also be firmly attached to the bracket 8 so as to detachably support the discharge valve housing 12. This valve housing 12 is preferably formed of molded rubber especially prepared so as to prevent the creation of odors and contamination of the washing and sterilizing liquid 7 flowing therethrough, and the flap valve 14 which is adapted to be opened by the accumulation of liquid 7 within the receptacle 16 when the interior of the latter is vented to the atmosphere, and to be closed by the counter-weight 15 when all of the accumulated liquid 7 has passed, is of relatively old and well known construction.

The auxiliary liquid reservoir or receptacle 16 is normally stationary, and the tubular casing 17 is formed of highly transparent material such as a tempered glass or plastic, while the upper inverted cup-shaped cover 18 is preferably constructed of stainless steel or the like with the aid of suitable punches and dies. The valve seat 19 of the cover 18 has a central opening therein through which the rod 23 extends freely, and the recesses 20 are formed to connect this opening with the ambient atmosphere whenever the valve 24 is lifted from the seat 19 as in Fig. 3. The hollow nipple 28 should be placed in constant communication with a source of vacuum through a pipe or tube 44 or the like so as to subject the interior of the receptacle 16 to reduced pressure when the valves 14, 24 are closed as in Fig. 1, and the connections 22 may be utilized for attachment of the teat cup suspension tubes 33 but care must be exercised to plug the connections 22 which are not in use. When tubes 33 are attached to the connections 22, the suspended teat cups 34 must be maintained submerged in the washing liquid 7 within the reservoir 6 as illustrated.

The vertically movable rod 23 has the upper control valve 24 fixedly attached thereto, and while the lower stop 26 may also be fixedly attached to this rod, the upper stop 25 is preferably adjustably attachable to any of a series of transverse holes 36 by means of a cotter pin 37 or the like, so as to vary the limits of travel of the float 30 along the rod 23. The float 30 is preferably formed of inverted downwardly open cup shape as depicted in Fig. 1, and of corrosion resistant material such as stainless steel, and the peripheral wall of this float 30 is disposed in close proximity to the interior surface of the tubular casing 17, while the center of the float is provided with an integral sleeve 38 slidably embracing the rod 23 and the upper and lower ends of which are engageable with the stops 25, 26 respectively, to shift the rod up or down. The rod 23 is thus guided at its lower portion for substantially vertical movement within the receptacle 16 by the float 30 with sufficient clearance to permit free flow of liquid 7 around the float periphery.

The threaded nipple 28 coacts with the screw threads of the bracket opening 10 to force the clamping block 27 against the cover 18 and the latter against the tubular casing 17, thereby firmly clamping the sections of the receptacle 16 against each other and against the discharge valve housing 12. The clamping block 27 and the nipple 28 are both formed of corrosion resistant material, and the circular block 27 is provided with a central bore 40 while the rod 23 above the valve 24 carries a plunger 41 which is slidable within the bore 40 with only slight clearance between these parts, see Figs. 2 and 3. The rod 23 is also provided below the valve 23 with a transverse opening 42 which is connected by a central conduit 43 with the interior of the bore 40 above the plunger 41, and the extreme upper end of the rod 23 is adapted to substantially seat against the upper end of the bore 40 when the valve 23 is fully open and in engagement with the lower plane surface 29 of the block 27. The upper end of the nipple 28 is connected by a tube or pipe 44 with a source of vacuum which may be the same source which normally actuates the milking machine.

When the various parts of the improved milking machine equipment washer shown in Figs. 1 to 3 inclusive have been properly constructed as above described, the receptacle 16 may be readily assembled upon the bracket 8 either before or after the latter has been mounted upon a support or wall 9, by merely applying the flap valve housing 14 to the shelf 11 and by thereafter setting the transparent casing 17 upon the housing 14 and the cap 18 with the rod 23 and float 30 applied upon the casing 17, and by finally clamping these parts in position with the aid of the block 27 and nipple 28. The interior of the receptacle 16 should then be connected to a source of vacuum such as the vacuum pump which normally operates the milking machine, by means of the pipe or tube 44, and one or more groups of teat cups 34 may be immersed within an abundance of warm sterilizing and washing liquid 7 confined within the reservoir or tank 6, and should be suspended by their tubes 33 from the cap connections 22. If any of these connections 22 are not being used, they should be sealed by a plug or cap so as not to expose the interior of the receptacle 16 to the ambient atmosphere through the idle connections 22.

When the pipe 44 has been placed in communication with the vacuum source and the unit has been assembled with milking machine teat cups 34 and connecting tubes 33 in the manner just described, and assuming the receptacle 16 to be empty, the flap valve 14 will be closed by the atmospheric pressure thereon and the control valve 24 will be closed by the sleeve 38 of the float 30 coacting with the lower stop 26 and by the external air pressure acting upon this control valve, as in Figs. 1 and 2. The vacuum established within the receptacle 16 through the opening 42 and conduit 43 will then draw cleansing liquid 7 from within the tank 6 through the teat cups 34 and tubes 33 into the interior of this receptacle thus flushing the teat cups and tubes in one direction, and causing the entering liquid 7 to rapidly accumulate above the closed flap valve 14 and to seal the lower open end of the float 30 and elevate the latter along the rod 23 within the tubular casing 17 away from the lower stop 26.

This rising or elevation of the float 30 continues until the central sleeve 38 engages the upper stop 25 whereupon the float moves the rod 23 upwardly and unseats the control valve 24. The interior of the receptacle 16 will then be exposed to the ambient atmosphere past the valve 24 and its seat 19 and through the radial recesses 20 of the cap 18, thus causing the weight of the liquid 7 which had accumulated within the receptacle 16 to automatically open the flap valve 14 so as to return the accumulated washing liquid to the tank 6, and simultaneously causing the liquid 7 confined within the teat cup suspension tubes 33 to flow by gravity downwardly through these tubes and through the teat cups 34 so as to provide a reverse flushing action.

When the control valve 24 is being opened by the engagement of the float 30 with the upper stop 25, the vacuum within the pipe 44, nipple 28, and in the bore 40 above the plunger 41, acts to quickly lift this plunger and to bring the flat upper face of the valve 24 into snug engagement with the lower plane surface 29 of the clamping block 27, thereby causing the atmospheric pressure acting upon the large exposed lower face of the valve 24 and the relatively lower pressure within the bore 40 to positively hold the control valve wide open as in Fig. 2, until the float 30 drops sufficiently to cause its central sleeve 38 to impinge against the lower stop 26. The rapidly descending float 30 then moves the rod 23 downwardly and causes the control valve 24 to close quickly, and this action is followed promptly when all of the accumulated liquid 7 has escaped from the reservoir 16, by closing of the flap valve 14, under the influence of the counter-weight 15 and the pressure differences acting thereon, thereby reestablishing the condition of the unit as shown in Fig. 1.

This cycle of operations will be repeated in relatively rapid succession, as long as the interior of the receptacle 16 remains in communication with the vacuum source through the pipe 44; and the rapidity of repetition may be readily varied by mounting the upper stop 25 at different locations along the rod 23 with the aid of the holes 36. When the valve 24 is being held in open position as in Fig. 3, air may escape to the internal passage of the nipple 28 through the opening 42 and conduit 43 formed in the upper end of the rod 23, but this escaping air will not prevent the maintenance of reduced pressure within the bore 40 sufficient to positively hold the valve 24 open. When the valve 24 is in closed position as in Fig. 2, a slight amount of air will seep past the plunger 41 and through the bore 40 into the vacuum line, but this seepage of air will not prevent the valve 24 from being held closed by the vacuum within the receptacle 16, and the plunger 41 also serves to maintain the rod 23 and valve 24 in centralized position.

The improved unit may also be utilized for the purpose of washing and sterilizing the main milk conducting line 32 of a milking machine by merely plugging all of the connections 22 in the cap 18 or by providing an upper cap 18' devoid of such connections, and by substituting for the lower outlet valve 14 and housing 12 a cup-shaped lower closure cap 12' having a connection 21 adapted to be placed in communication with one end of a milk line 32 with the aid of a rubber tube 31 or the like as illustrated in Fig. 4, while the opposite end of the milk line 32 should be immersed within a cleansing liquid reservoir 6. With the unit thus modified and installed, the tube 44 may be brought into communication with the vacuum source, whereupon the washer will function to automatically draw cleansing liquid 7 from within the reservoir 6 through the main line 32 and connection 21 into the casing 16 whenever the control valve 24 is closed as in Fig. 2 thereby causing the float 30 to rise, and will also cause the rising float 30 to open the valve 24 when it engages the upper stop 25 in order to admit air to the casing 16 and thereby permitting the liquid 7 from within this casing to flow by gravity through the milk line 32 in the opposite direction. This cycle of operations will also be repeated as long as the vacuum is applied, thus producing thorough flushing and cleansing of the milk line 32.

From the foregoing detailed description it will be apparent that the present invention in fact provides an improved dairy equipment cleaner which is simple and compact in construction and highly efficient and automatic in operation. With the improved sterilizing and washing unit, the flow of cleansing liquid 7 through the teat cups 34 and connecting tubes 33 or through the milk line 32 may be reversed rapidly and as long as desired, and the speed of such reversal of flow may be varied at the will of the operator. The vertically movable float 30 cooperates with the vacuum assembly associated with the control valve 24 to insure quick alternate opening and closing of this valve while the float 30 is rising and descending and liquid is being admitted to and discharged from the receptacle 16. This is important in order to produce rapid and most effective flushing and cleansing action far superior to that obtainable with similar washers wherein the float was rigidly connected to the air admission valve. The normally stationary receptacle 16 also provides a unit having few simple parts and a minimum number of movable elements, and all of these parts and elements may be readily dismantled for thorough cleaning and just as readily re-assembled by merely manipulating the clamping nipple 28. The improved unit may be manufactured at moderate cost in various sizes, and has proven highly satisfactory and successful in actual commercial use.

It should be understood that it is not desired to limit this invention to the exact details of construction and to the precise mode of operation of the dairy equipment cleanser herein specifically shown and described, for various modifications within the scope of the appended claims may occur to persons skilled in the art.

I claim:

1. In a milking machine teat cup and tube cleaner of the type wherein the cups are submerged in a supply of cleansing liquid while the tubes are alternately communicable with a source of vacuum and with the ambient atmosphere to cause the liquid to flow back and forth through the milking machine parts, a vertically elongated stationary liquid receptacle having its upper interior constantly connected to a source of vacuum and also communicable with the teat cup connecting tubes and being provided at its lower end with a liquid discharge valve, an upright rod movable longitudinally within said receptacle and having a control valve secured to its upper end and vertically spaced relatively adjustable stops nearer to its lower end, said control valve being operable to alternately seal said receptacle from and to connect the interior thereof with the ambient atmosphere and said upper rod end being provided with a constantly open internal conduit connecting the interior of said receptacle with said vacuum source, a float movable vertically along said rod between said stops by the rise and fall of the liquid within said receptacle to engage the upper stop and to open said control valve to admit atmospheric air into said receptacle when the liquid reaches a predetermined high level and to engage the lower stop and to close said control valve when said discharge valve is open to deliver liquid from said receptacle, and vacuum actuated means for holding said control valve open until said float engages said lower stop.

2. In a milking machine teat cup and tube cleaner of the type wherein the cups are submerged in a supply of cleansing liquid while the tubes are alternately communicable with a source of vacuum and with the ambient atmosphere to cause the liquid to flow back and forth through the milking machine parts, a stationary liquid receptable having an upper detachable closure cap and its upper interior constantly connected to a source of vacuum and communicable with the teat cup connecting tubes and being provided at its lower end with a liquid discharge valve, a rod like element movable longitudinally within said receptacle and having a control valve and a plunger secured directly to its upper end and also having spaced stops nearer to its lower end, a clamping block for said closure cap having a bore connected to a source of vacuum and with which said plunger is slidably cooperable, said control valve being operable to alternately seal said receptacle and to connect the latter with the ambient atmosphere, a float movable along said rod between said stops by the rise and fall of the liquid within said receptacle to engage one stop and to open said control valve when the liquid reaches a predetermined high level and to engage the other stop and to close said control valve when said discharge valve is open to deliver liquid from said receptacle, and means for subjecting said plunger to vacuum to hold said control valve open until said float engages said other stop.

3. In a milking machine teat cup and tube cleaner of the type wherein the cups are submerged in a supply of cleansing liquid while the tubes are alternately communicable with a source of vacuum and with the ambient atmosphere to cause the liquid to flow back and forth through the milking machine parts, a liquid receptacle having its upper interior constantly connected to a source of vacuum and communicable with the teat cup connecting tubes and being provided at its lower end with a liquid discharge valve, an upright rod movable longitudinally within said receptacle and having a control valve and a plunger secured directly to and located coaxially of its upper end and also having spaced stops nearer to its lower end, said upper rod end also being provided with a constantly open internal conduit connecting the receptacle interior with said vacuum source, a stationary element having a bore with which said plunger is slidably cooperable, said control valve being operable to alternately seal said receptacle from and to connect the interior thereof with the ambient atmosphere, a float movable along said rod between said stops by the rise and fall of the liquid within said receptacle to engage the upper of said stops to open said control valve when the liquid reaches a predetermined high level and to engage the lower stop to close said control valve when said discharge valve is open to deliver liquid from said receptacle, and means communicating with said vacuum source and being cooperable with said plunger and said element to hold said control valve open until said float engages said other stop.

4. In a milking machine tubular element cleaner of the type wherein one end of each element is submerged in a supply of cleansing liquid while the opposite end thereof is alternatively communicable with a vacuum source and with the ambient atmosphere to cause the liquid to flow back and forth through the element, a liquid receptacle having its interior communicable with the vacuum source and with the cleansing liquid supply through the element which is to be cleaned, an upright rod reciprocable vertically within said receptacle and having a control valve and a pair of vertically spaced abutments secured directly thereto, said rod also being provided with a constantly open internal conduit connecting the receptacle interior with said vacuum source and said valve being operable to alternately connect the interior of said receptacle with the vacuum source through said conduit when said rod descends and with the ambient atmosphere when the rod ascends, and a float movable along said rod between said abutments by the rise and fall of liquid within said receptacle for engaging said abutments to move the rod thereby to selectively open and close said control valve.

5. In a milking machine teat cup and tube cleaner of the type wherein the cups are submerged in cleansing liquid while the tubes are alternately communicable with a vacuum source and with the ambient atmosphere to cause the liquid to surge back and forth through the cups and tubes, a liquid receptacle having an ambient air inlet and an adjacent bore communicating with said vacuum source at its upper end and a liquid discharge valve at its lower end, an upright rod reciprocable longitudinally within said receptacle and having an air control valve cooperable with said inlet and a plunger cooperable with said bore at its upper end and being provided with vertically spaced stops nearer to its lower end, said upper rod end also having a constantly open conduit therein passing through said plunger and said air control valve and connecting the receptacle interior with said bore above said plunger and with said vacuum source and said air control valve being operable to alternately seal said air inlet and to open the same to admit atmospheric air into said receptacle, and a float movable along said rod between said stops by the rise and fall of the liquid within said receptacle to alternately engage the upper and lower stops to open and close said air control valve.

6. In a milking machine milk conducting line cleaner of the type wherein one end of the line is submerged in a supply of cleansing liquid while the opposite end thereof is alternately communicable with a vacuum source and with the ambient atmosphere to cause the liquid to flow back and forth through the line, a liquid receptacle having its interior communicable with the vacuum source and with the cleansing liquid supply through the milk conducting line which is to be cleaned, an upright rod reciprocable vertically within said receptacle and having a control valve and a pair of vertically spaced abutments secured directly thereto, said rod also being provided with a constantly open internal conduit connecting the receptacle interior with said vacuum source and said valve being operable to alternately connect the interior of said receptacle with the vacuum source through said conduit when said rod descends and with the ambient atmosphere when the rod ascends, and a float movable along said rod between said abutments by the rise and fall of liquid within said receptacle for engaging said abutments to move the rod thereby to selectively open and close said control valve.

References Cited in the file of this patent
UNITED STATES PATENTS

| | | |
|---|---|---|
| 566,625 | Savorgnan | Aug. 25, 1896 |
| 1,433,216 | McCutchen | Oct. 24, 1922 |
| 1,484,505 | Kiefer | Feb. 19, 1924 |
| 1,645,356 | Shurts | Oct. 11, 1927 |
| 2,733,667 | Hill | Feb. 7, 1956 |